United States Patent
Lee et al.

(10) Patent No.: US 8,325,831 B2
(45) Date of Patent: Dec. 4, 2012

(54) METHOD FOR ESTIMATING FREQUENCY OFFSET IN SYSTEM UTILIZING A PLURALITY OF SUB-CARRIERS

(75) Inventors: Youngyoon Lee, Suwon-si (KR); Seokho Yoon, Suwon-si (KR); Taeung Yoon, Suwon-si (KR); Dahae Chong, Suwon-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 980 days.

(21) Appl. No.: 12/363,399

(22) Filed: Jan. 30, 2009

(65) Prior Publication Data

US 2009/0323837 A1     Dec. 31, 2009

(30) Foreign Application Priority Data

Jun. 27, 2008     (KR) .................. 10-2008-0061698

(51) Int. Cl.
*H04K 1/10*     (2006.01)
(52) U.S. Cl. ....................... 375/260; 375/130
(58) Field of Classification Search ............ 375/260
See application file for complete search history.

(56) References Cited

U.S. PATENT DOCUMENTS

| | | | | |
|---|---|---|---|---|
| 8,009,768 B1* | 8/2011 | Lee et al. | ............ | 375/340 |
| 2004/0120248 A1* | 6/2004 | Lee et al. | ............ | 370/208 |
| 2005/0036564 A1* | 2/2005 | Peter et al. | ............ | 375/260 |
| 2009/0097597 A1* | 4/2009 | Li et al. | ............ | 375/344 |

OTHER PUBLICATIONS

Youngyoon Lee et al. "A New Pilot-Aided Integer Frequency Offset Estimation Method for Digital Video Broadcasting (DVB) Systems", Journal of ICACT 2008, Feb. 17-20, 2008, International Conference on Advanced Communication Technology, Korea.

* cited by examiner

*Primary Examiner* — Shuwang Liu
*Assistant Examiner* — Michael Neff
(74) *Attorney, Agent, or Firm* — Bryan Cave LLP

(57) ABSTRACT

An integer frequency offset estimation scheme in an orthogonal frequency division multiplexing (OFDM)-based system is disclosed. A receiving apparatus for receiving a signal according to an OFDM includes an OFDM symbol acquisition module for acquiring at least two consecutive OFDM symbols, a symbol operation module for operating upon pilot symbols and/or data symbols belonging to frequency bands determined according to a plurality of candidates for integer frequency offsets among a plurality of pilot symbols and a plurality of data symbols included in the acquired OFDM symbols, and an integer frequency offset estimation module for selecting a final integer frequency offset among a plurality of candidates for integer frequency offsets according to magnitudes of operation values obtained by the symbol operation module, wherein the frequency bands determined according to the candidate for integer frequency offsets are obtained by frequency-shifting preset frequency bands at which all pilot symbols are transmitted according to the candidate for integer frequency offsets.

12 Claims, 9 Drawing Sheets

[Fig.1]
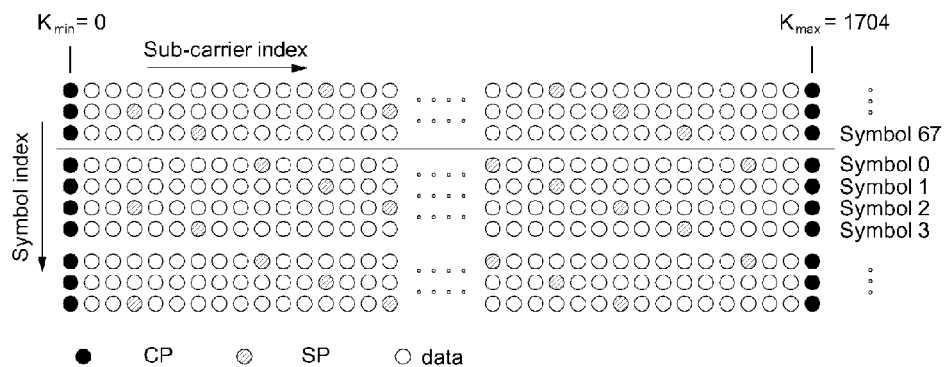
[Fig.2a]
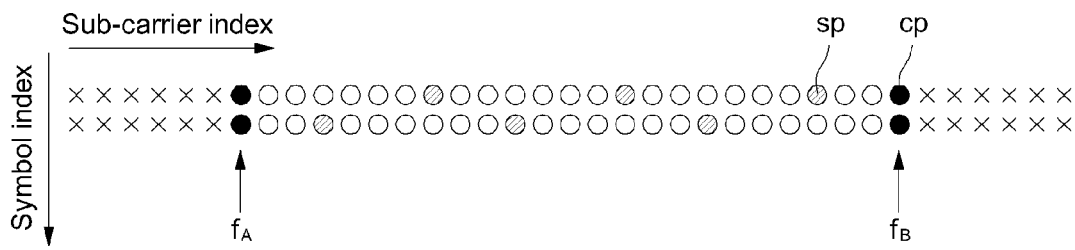
[Fig.2b]
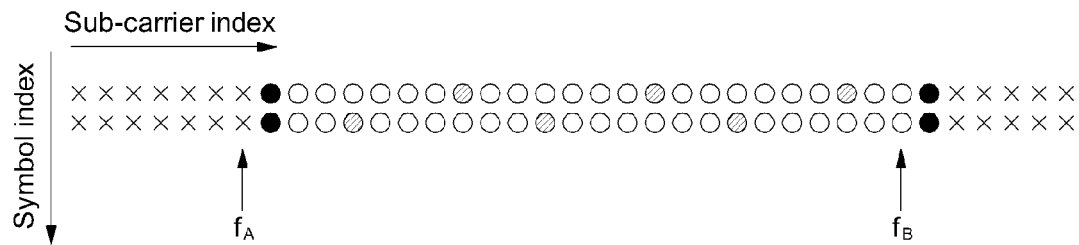

[Fig.2c]
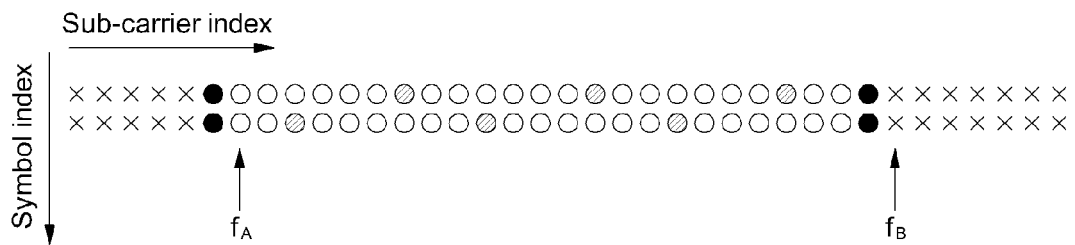
[Fig.3]
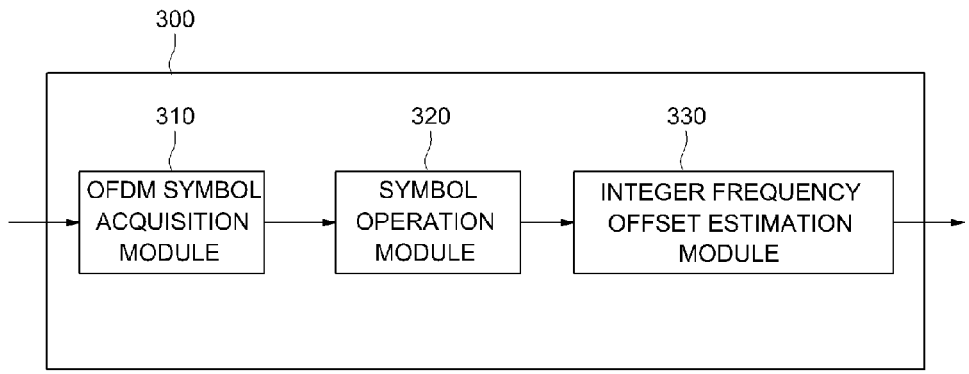
[Fig.4]
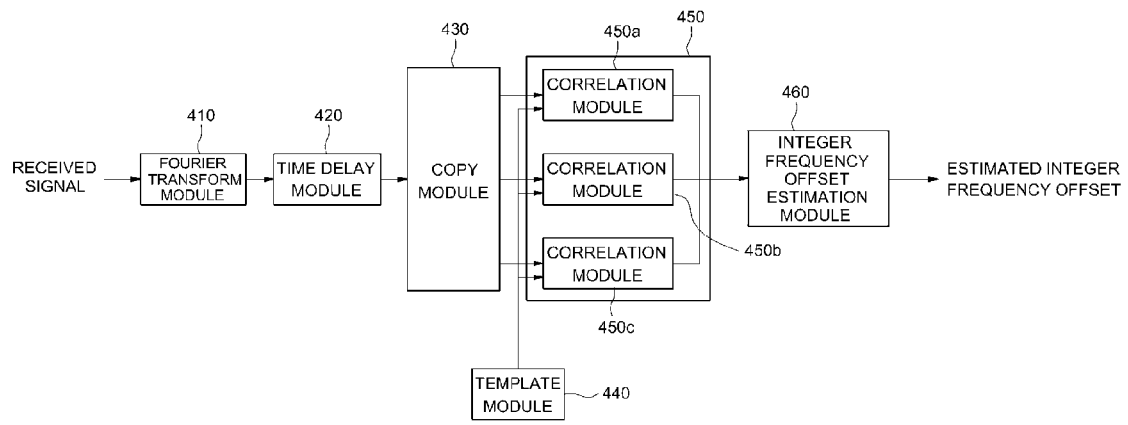

[Fig.5a]
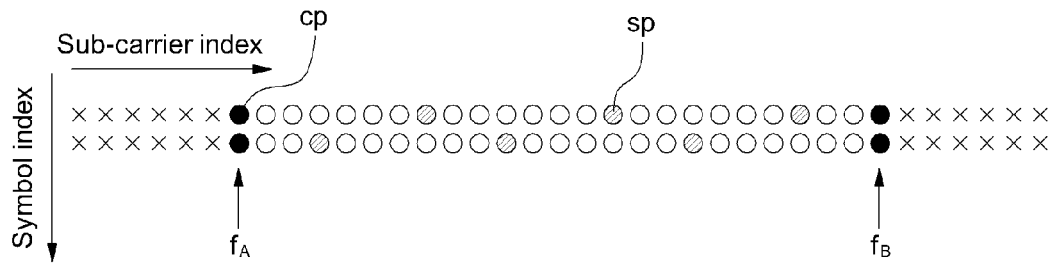
[Fig.5b]
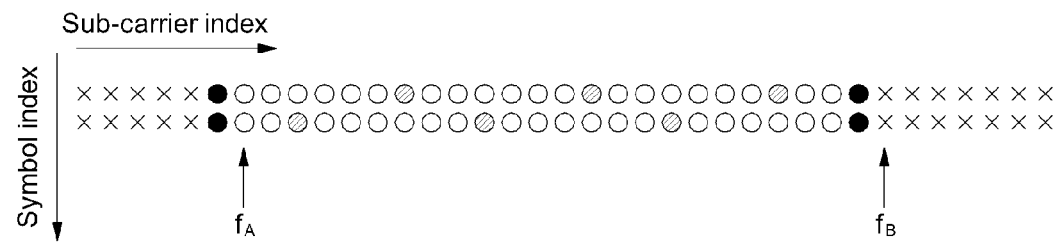
[Fig.5c]
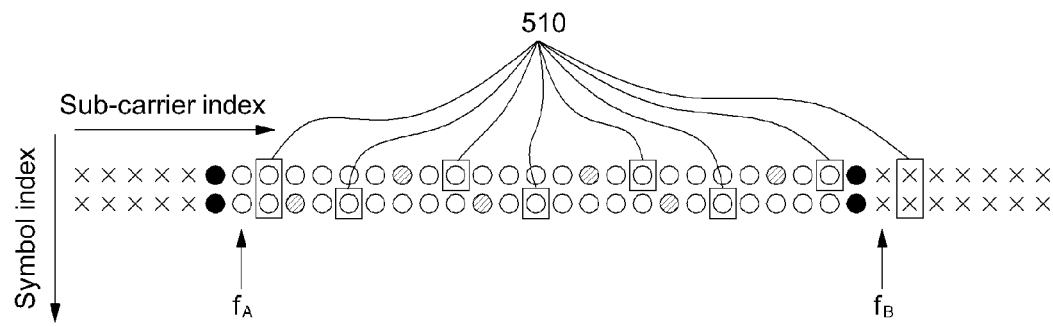

[Fig.5d]
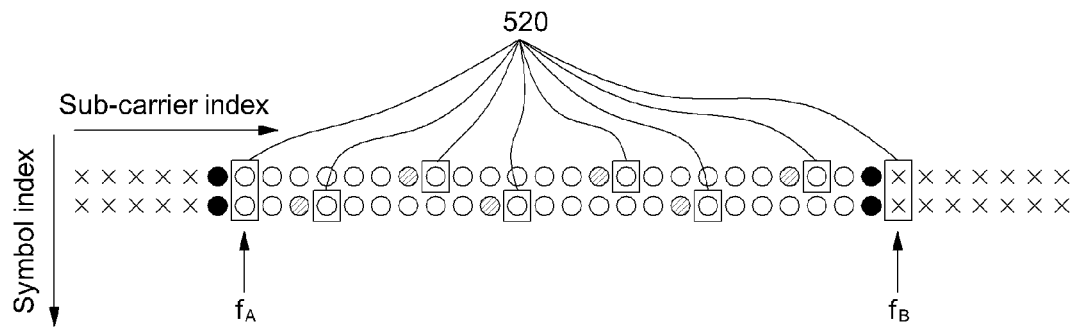
[Fig.5e]
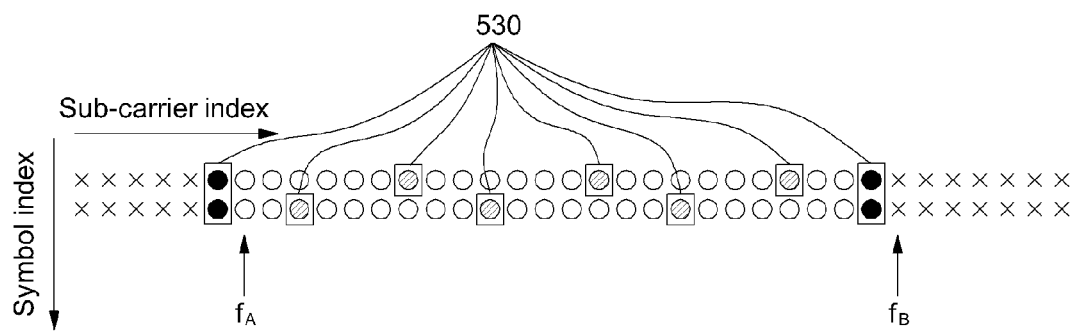

[Fig.6a]
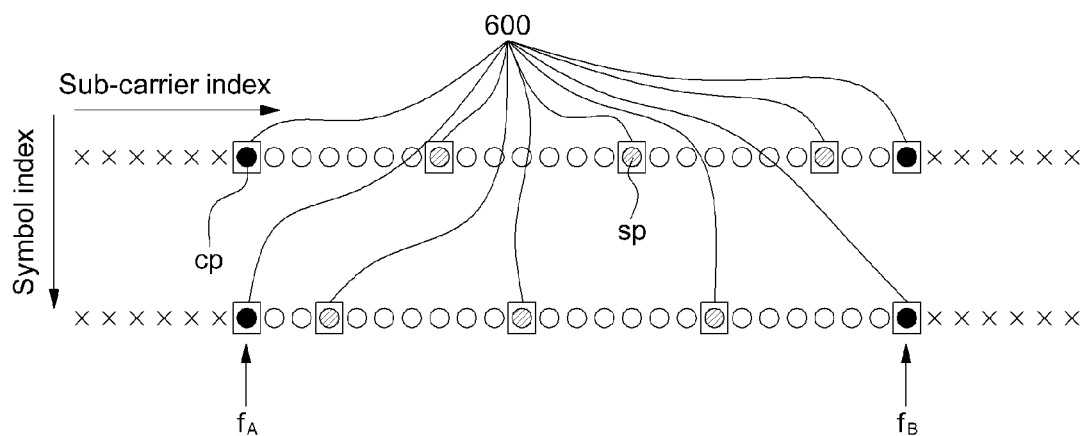
[Fig.6b]
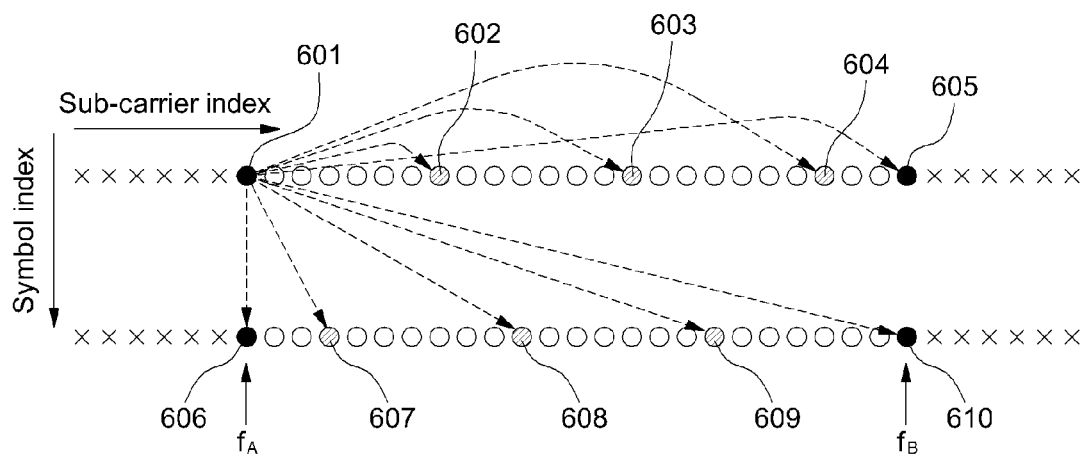

[Fig.6c]
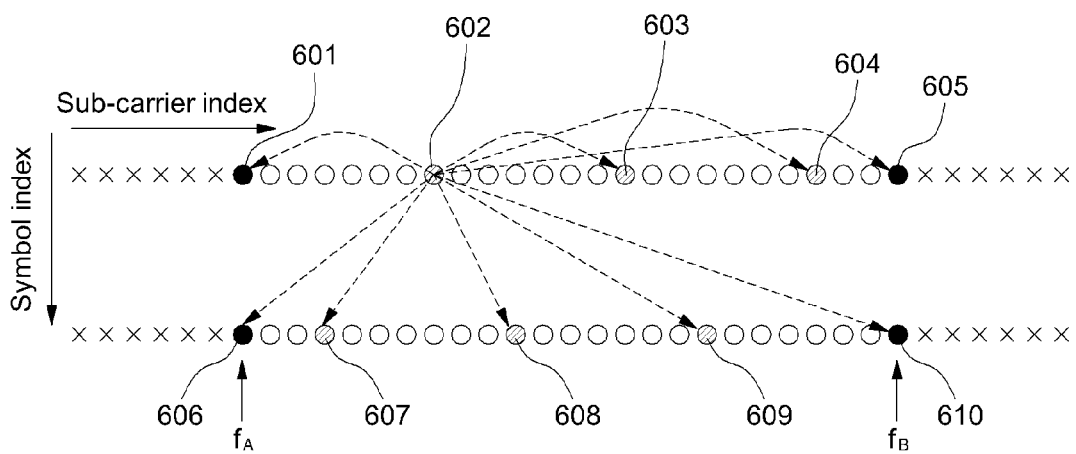
[Fig.7]
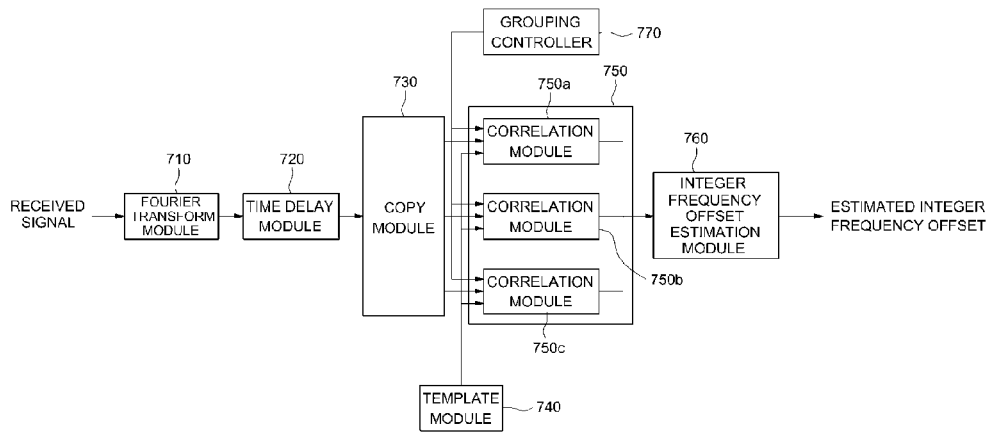

[Fig.8a]
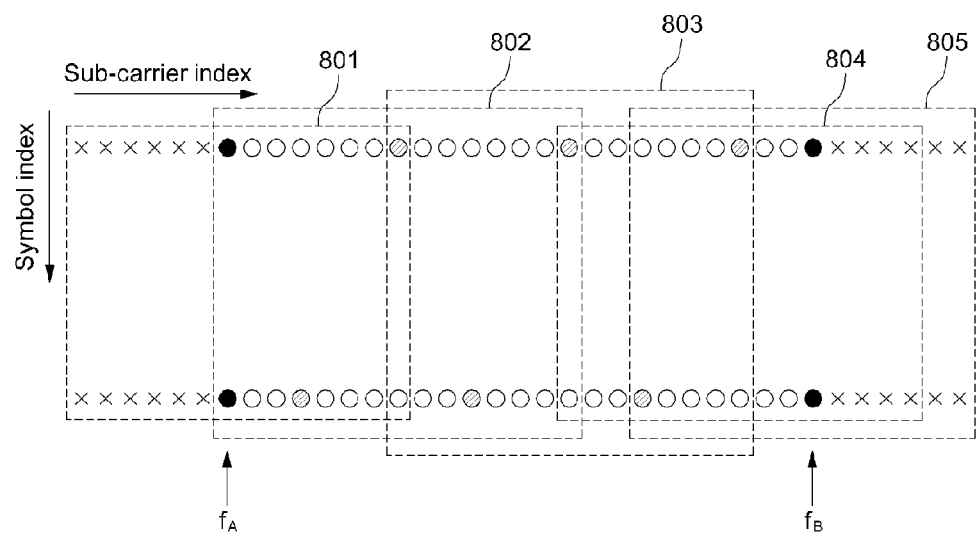
[Fig.8b]
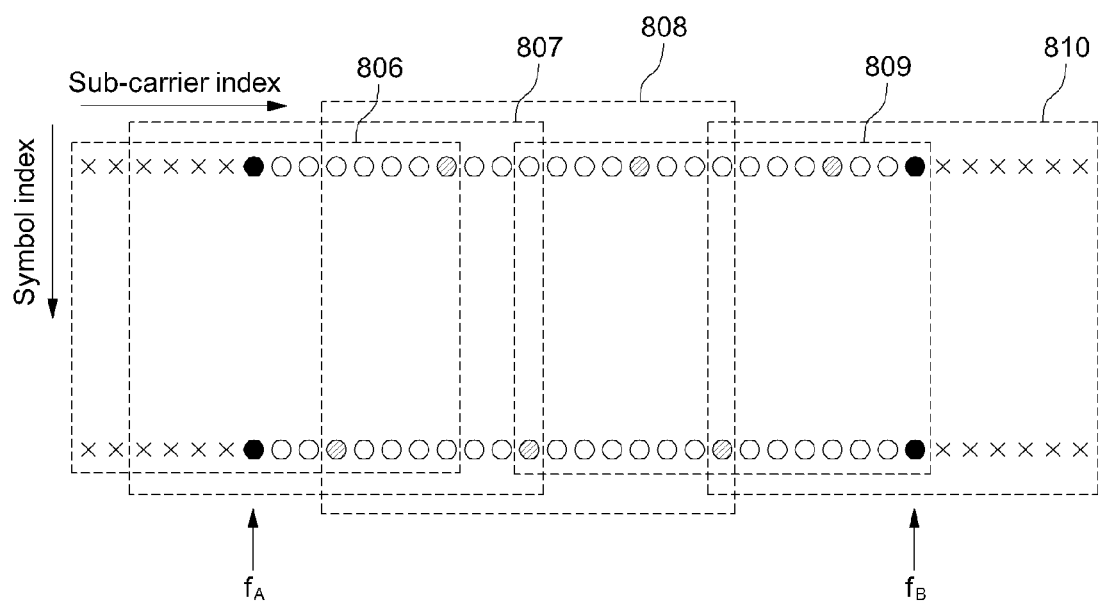

[Fig.8c]
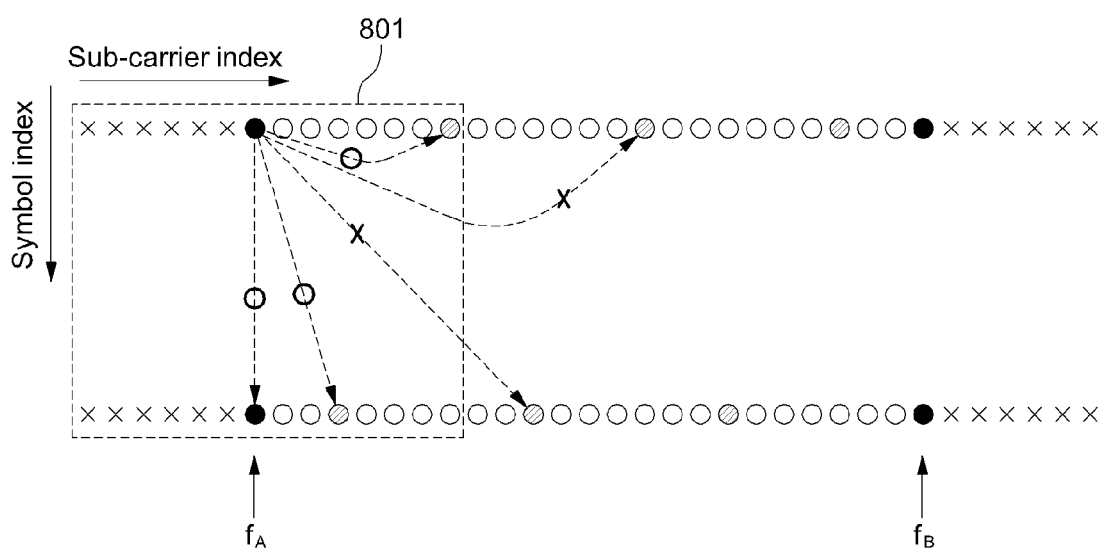
[Fig.9]
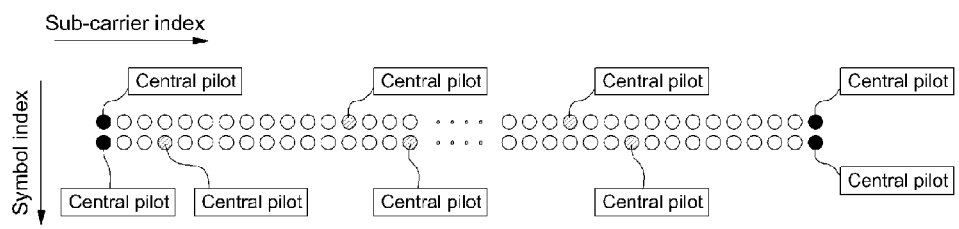

[Fig.10]
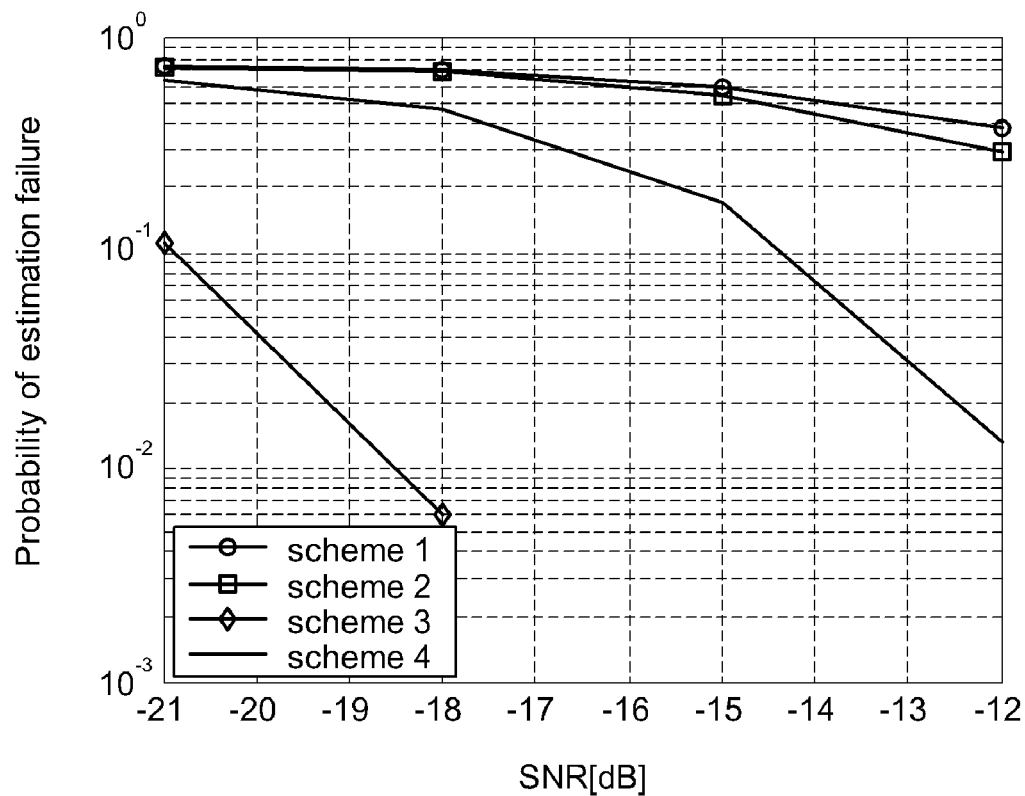
[Fig.11]
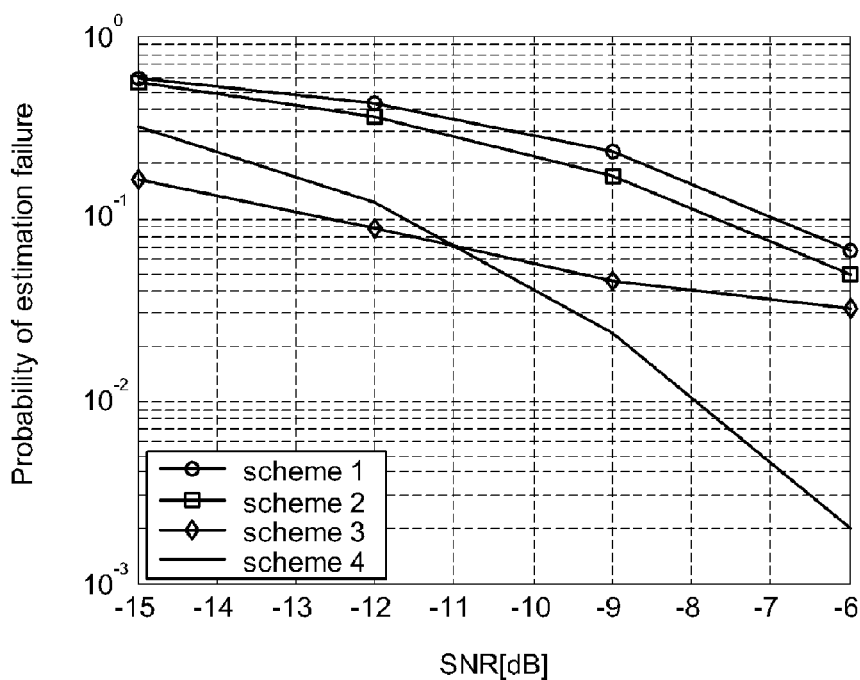

METHOD FOR ESTIMATING FREQUENCY OFFSET IN SYSTEM UTILIZING A PLURALITY OF SUB-CARRIERS

BACKGROUND OF THE INVENTION

1. Field of the Invention

The present invention relates to an orthogonal frequency division multiplexing (OFDM)-based receiving scheme, and more particularly to an integer frequency offset estimation scheme in an OFDM-based system.

2. Description of the Related Art

An OFDM scheme may be applied to various systems such as mobile communication, digital broadcasting, etc. Hereinafter a digital video broadcasting system will be described as an example of such various systems.

Digital video broadcasting is a digital television broadcasting specification in Europe. Digital video broadcasting includes digital video broadcasting-satellite (DVB-S), digital video broadcasting-terrestrial (DVB-T), and digital video broadcasting-handheld (DVB-H).

To demodulate the transmitted data, a receiver should recognize accurate frequency offset information. A prior art related thereto includes a scheme based on a continual pilot symbol correlation and a scheme based on a continual/scattered pilot symbol correlation.

The scheme based on a continual pilot symbol correlation receives two consecutive OFDM symbols and estimates an integer frequency offset using a correlation of continual pilots inserted to the same index of the two symbols. Such a scheme uses only the correlation provided by continual pilot symbols located on the same index.

The scheme based on a continual/scattered pilot symbol correlation uses two correlations between pilot symbols in two OFDM symbols. A correlation of continual pilots and scattered pilots located most adjacent to the continual pilots is used and simultaneously a correlation of continual pilots having the same index located within the two consecutive symbols is used, thereby estimating an integer frequency offset. Such a scheme employs only a part of information provided by the pilot symbols on the assumption that channel changes so fast.

SUMMARY OF THE INVENTION

Therefore, the present invention provides a frequency offset estimation scheme having improved performance.

In accordance with the present invention, the above and other objects can be accomplished by the provision of a receiving apparatus, including an OFDM symbol acquisition module for acquiring at least two consecutive OFDM symbols, a symbol operation module for operating upon pilot symbols and/or data symbols belonging to frequency bands determined according to a plurality of candidates for integer frequency offsets among a plurality of pilot symbols and a plurality of data symbols included in the acquired OFDM symbols, and an integer frequency offset determination module for selecting a final integer frequency offset among a plurality of candidates for integer frequency offsets according to magnitudes of operation values obtained by the symbol operation module, wherein the frequency bands determined according to the candidate for integer frequency offsets are obtained by frequency-shifting preset frequency bands at which all pilot symbols are transmitted according to the candidate for integer frequency offsets.

In accordance with another aspect of the present invention, there is provided a receiving apparatus for receiving a signal according to an OFDM scheme, including an OFDM symbol acquisition module for acquiring at least two consecutive OFDM symbols, a symbol operation module for operating upon pilot symbols and/or data symbols belonging to frequency bands determined according to a plurality of candidates for integer frequency offsets among a plurality of pilot symbols and a plurality of data symbols included in the acquired OFDM symbols, and an integer frequency offset determination module for determining a final integer frequency offset among the plurality of candidate for integer frequency offsets according to magnitudes of operation values obtained by the symbol operation module, wherein the symbol operation module groups the frequency bands into a plurality of frequency band groups, individually operates upon pilot symbols and/or data symbols contained in each of the frequency band groups, and sums intermediate results calculated individually from each of the frequency band groups, thereby generating an operation value.

In accordance with a further aspect of the present invention, there is provided a receiving method, including acquiring at least two consecutive OFDM symbols, operating upon pilot symbols and/or data symbols belonging to frequency bands determined according to a plurality of candidates for integer frequency offsets among a plurality of pilot symbols and a plurality of data symbols included in the acquired OFDM symbols, and determining a final integer frequency offset among a plurality of candidates for integer frequency offsets according to magnitudes of operation values obtained by the operating, wherein the frequency bands determined according to the candidate for integer frequency offsets are obtained by frequency-shifting preset frequency bands at which all pilot symbols are transmitted according to the candidate for integer frequency offsets.

In accordance with another aspect of the present invention, there is provided a receiving method, including acquiring at least two consecutive OFDM symbols, operating upon pilot symbols and/or data symbols belonging to frequency bands determined according to a plurality of candidates for integer frequency offsets among a plurality of pilot symbols and a plurality of data symbols included in the acquired OFDM symbols, and determining a final integer frequency offset among a plurality of candidates for integer frequency offsets according to magnitudes of operation values obtained by the operating, wherein the operating groups the frequency bands into a plurality of frequency band groups, individually operates upon pilot symbols and/or data symbols contained in each of the frequency band groups, and sums intermediate results calculated individually from each of the frequency band groups, thereby generating an operation value.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates pilot arrangement in a DVB system with 2K mode in which a total of 2048 sub-carriers are used;

FIGS. 2a to 2c are views explaining integer frequency offsets estimated according to the present invention;

FIG. 3 is a block diagram of an integer frequency offset estimation system according to an exemplary embodiment of the present invention;

FIG. 4 is a block diagram illustrating an example of implementing specifically the system of FIG. 3;

FIGS. 5a to 5e illustrate pilot symbols and/or data symbols upon which each correlation module operates;

FIGS. 6a to 6c are views explaining an operation method performed by a correlation module according to an exemplary embodiment of the present invention;

FIG. 7 illustrates an example of a receiving system according to another exemplary embodiment of the present invention;

FIGS. 8a to 8c illustrate examples of grouping a frequency band into a plurality of frequency band groups under the control of a grouping controller;

FIG. 9 illustrates an example of grouping a frequency band into frequency band groups in a 2K mode; and FIGS. 10 and 11 illustrate probability of failure in an integer frequency offset of two conventional methods and two proposed methods in an additive white Gaussian noise environment and a multipath environment.

DETAILED DESCRIPTION OF THE INVENTION

The above and other objects, features and other advantages of the present invention will be more clearly understood from the following embodiments of the present invention. Hereinafter, the exemplary embodiments of the present invention will be described with reference to the accompanying drawings.

The present exemplary embodiment proposes a frequency offset estimation scheme and is applicable to various communication/broadcasting systems. Among such communication/broadcasting systems, the present exemplary embodiment is described based on a digital video broadcasting system.

A digital video broadcasting system conforming to the conventional digital video broadcasting (DVB) specification may be divided into a 2K mode and an 8K mode according to the number of sub-carriers.

FIG. 1 illustrates pilot arrangement in a DVB system with 2K mode in which a total of 2048 sub-carriers are used. As illustrated in FIG. 1, 1705 sub-carriers among the 2048 sub-carriers are used to transmit pilot symbols and data symbols.

A 2K-mode digital video broadcasting system transmits 45 continual pilot (CP) symbols and 142 or 143 scattered pilot (SP) symbols. A value of a pilot symbol may be +4/3 or −4/3 and may be determined by a pseudo random binary sequence (PRBS).

In FIG. 1, a horizontal axis corresponds to a sub-carrier index for discriminating between sub-carriers and a vertical axis corresponds to a symbol index for discriminating between OFDM symbols. Namely, the horizontal axis corresponds to a frequency region and the vertical axis corresponds to a time region.

As shown, in the 2K mode, an SP symbol is inserted every 12 sub-carriers on one OFDM symbol. The location of the SP symbol within OFDM symbols is repeated every 4 OFDM symbols.

FIGS. 2a to 2c are views explaining integer frequency offsets estimated according to the present invention. FIG. 2a illustrates frequency bands at which SP and CP symbols are transmitted according to a preset specification. As described above, since frequency bands (i.e., locations on the horizontal axis) at which the SP symbol and the CP symbol are transmitted and pilot values (complex values) corresponding thereto differ according to the preset specification, a receiving end observes corresponding frequency bands to normally receive the CP and SP symbols. However, integer frequency offsets may occur due to various factors such as distortion in a wireless channel.

FIG. 2b illustrates the case where an integer frequency offset of '+1' occurs. As shown, two OFDM symbols transmitted as illustrated in FIG. 2a may be received at the receiving end as illustrated in FIG. 2b. This case may be referred to as occurrence of an integer frequency offset of '+1'.

FIG. 2c illustrates the case where an integer frequency offset of '−1' occurs. Two OFDM symbols transmitted as illustrated in FIG. 2a may be received at the receiving end as illustrated in FIG. 2c. This case may be referred to as occurrence of an integer frequency offset of '−1'.

When an integer frequency offset occurs as illustrated in FIG. 2b or 2c, a frequency offset value should be accurately estimated to normally restore data.

Hereinafter, an integer frequency offset estimation system and method proposed by the present embodiment will be described.

FIG. 3 is a block diagram of an integer frequency offset estimation system according to an exemplary embodiment of the present invention. The system includes an OFDM symbol acquisition module 310 for acquiring at least two consecutive OFDM symbols, a symbol operation module 320 for operating upon pilot symbols and/or data symbols belonging to frequency bands determined according to a plurality of candidates for integer frequency offsets among a plurality of pilot symbols and data symbols included in the OFDM symbols, and an integer frequency offset estimation module 330 for selecting a final integer frequency offset among a plurality of candidates for integer frequency offsets according to magnitudes of operation values obtained by the symbol operation module 320.

FIG. 4 is a block diagram illustrating an example of implementing specifically the system of FIG. 3. The block diagram of FIG. 3 may be implemented in various ways and one example is illustrated in FIG. 4. A system of FIG. 4 includes a Fourier transform module 410, a time delay module 420, a copy module 430, a template module 440, a correlation module 450, and an integer frequency offset estimation module 460.

The OFDM symbol acquisition module 310 for acquiring at least two consecutive OFDM symbols as shown in FIG. 3 may be implemented by the Fourier transform module 410 and the time delay module 420 shown in FIG. 4. The Fourier transform module 410 performs Fourier transform upon a signal received through various conventional means (e.g., one or more antennas). A signal converted into a signal of a frequency region by the Fourier transform module 410 is input to the time delay module 420.

The time delay module 420 performs time delays upon received OFDM symbols so that two consecutive OFDM symbols are input to the copy module 430.

The symbol operation module 320 shown in FIG. 3 may be implemented by the copy module 430, the template module 440, and the correlation module 450 shown in FIG. 4. The copy module 430 copies the output of the time delay module 420 in correspondence to the number of candidate for integer frequency offsets. The copied outputs are input to correlation modules equal in number to the candidate for integer frequency offsets.

The present embodiment proposes estimation of an integer frequency offset using candidate for integer frequency offsets. For example, if there are (2a+1) candidates for values {−a, −a+1, −a+2, ..., 0, 1, 2, ..., a−1, a}, respective candidate for values are operated upon. Operation results for the respective candidate for values are compared and any one of the candidate s for values is estimated as a final frequency offset.

Since the number of correlation modules in FIG. 4 corresponds to the number of candidate for integer frequency offsets, one correlation module corresponds to any one candidate for integer frequency offset. That is, each of the correlation modules correspond to candidate for integer frequency offsets one by one.

The correlation module 450 operates upon pilot symbols and/or data symbols belonging to frequency bands determined according to one candidate for integer frequency offset. The correlation module 450 also operates using template information provided by the template module 440. Hereinafter, operation of the correlation module 450 will be described.

For example, when estimating an offset from 3 candidates for integer frequency offsets {−1, 0, +1}, the correlation module 450 includes a correlation module 450a corresponding to the candidate for integer frequency offset of '+1', a correlation module 450b corresponding to the candidate for integer frequency offset of '0', and a correlation module 450c corresponding to the candidate for integer frequency offset of '−1'.

FIGS. 5a to 5e illustrate pilot symbols and/or data symbols upon which each correlation module operates. FIG. 5a illustrates frequency bands at which CP symbols and SP symbols are arranged according to a preset specification. Since FIG. 5a shows one example explaining the present embodiment, it is apparent that the present invention is not limited to a specific arrangement shown in FIG. 5a.

FIG. 5b illustrates OFDM symbols transformed by the Fourier transform module 410. As shown, since an integer frequency offset of '−1' is generated, the integer frequency offset of −'1' should be estimated according to the exemplary embodiment of the present invention.

FIG. 5c illustrates (pilot and/or data) symbols upon which the correlation module 450a corresponding to the candidate for integer frequency offset of '+1' operate. Actually, a signal input to the correlation module 450a is two OFDM symbols having the integer frequency offset of '−1' as illustrated in FIG. 5c. However, the correlation module 450a operates upon symbols (i.e., data symbols rather than pilot symbols) belonging to frequency bands 510 determined according to the candidate for integer frequency offset of '+1'.

FIG. 5d illustrates (pilot and/or data) symbols upon which the correlation module 450b corresponding to the candidate for integer frequency offset of '0' operates. Actually, a signal input to the correlation module 450b is two OFDM symbols having the integer frequency offset of '−1' as illustrated in FIG. 5d. However, the correlation module 450b operates upon symbols (i.e., data symbols rather than pilot symbols) belonging to frequency bands 520 determined according to the candidate for integer frequency offset of '0'.

FIG. 5e illustrates (pilot and/or data) symbols upon which the correlation module 450c corresponding to the candidate for integer frequency offset of '−1' operates. As illustrated in FIG. 5e, the correlation module 450c operates upon symbols (i.e., CP or SP symbols) belonging to frequency bands 530 determined according to the candidate for integer frequency offsets of −'1'.

As illustrated in FIG. 5c, since the correlation module 450a corresponding to the candidate for integer frequency offset of '+1' operates upon symbols belonging to the frequency bands 510, data symbols, rather than pilot symbols, are operated upon. Further, as illustrated in FIG. 5d, since the correlation module 450b corresponding to the candidate for integer frequency offsets of '0' operates upon symbols belonging to the frequency bands 520, data symbols, rather than pilot symbols, are operated upon. However, the correlation module 450c corresponding to the candidate for integer frequency offset of '−1' operates only upon pilot symbols (i.e., SP symbols and CP symbols).

FIGS. 6a to 6c are views explaining an operation method performed by a correlation module according to an exemplary embodiment of the present invention. FIG. 6a illustrates an example of CP symbols and SP symbols arranged according to a preset specification. Hereinafter, an example of operating upon frequency bands 600 determined according to any specific candidate for integer frequency offset in any correlation module will be described.

FIGS. 6b and 6c illustrate examples for explaining a method of operating upon 10 symbols 601 to 610 within the frequency bands 600. The correlation module according to the system of FIG. 4 may calculate multiplications of all combinations of symbols belonging to frequency bands determined according to one candidate for integer frequency offset and may add the multiplication values. In the examples of FIGS. 6b and 6c, frequency bands determined according to one candidate for integer frequency offset are frequency bands 600, and multiplications of all combinations of the 10 symbols 601 to 610 contained in the frequency bands 600 are calculated. In more detail, as illustrated in FIG. 6b, multiplication of the symbols 601 and 602, multiplication of the symbols 601 and 603, multiplication of the symbols 601 and 604, . . . , multiplication of the symbols 601 and 609, and multiplication of the symbols 601 and 610 are calculated. Moreover, as illustrated in FIG. 6c, multiplication of the symbols 602 and 601, multiplication of the symbols 602 and 603, multiplication of the symbols 602 and 604, . . . , multiplication of the symbols 602 and 609, and multiplication of the 602 and 610 are calculated. These multiplications are repeated $_{10}P_2$ times (the number of all permutations with respect to the 10 symbols). The multiplication values are summed to yield one operation value.

The correlation module according to the system of FIG. 4 may additionally operate using template information provided by the template module 440. Hereinafter, the template information will be described.

The template information indicates a ratio of values of pilot symbols. That is, in the example of FIG. 6b, template information corresponding to the symbols 601 and 602 indicates a ratio of values of the symbols 601 and 602. For example, if a value of the symbol 601 is '+4/3' and a value of the symbol 602 is '−4/3', template information corresponding to the symbols 601 and 602 is '−1'.

The correlation module according to the system of FIG. 4 may multiply the values of the symbols 601 and 602 (specifically, multiply conjugate complexes) and further multiply the template information corresponding to the symbols 601 and 602. Accordingly, if the CP symbols and/or the SP symbols are operated upon by the correlation module according to the system of FIG. 4, since all multiplied symbols have positive values, a final operation value is a very large positive value. However, when operating upon data symbols by the correlation module according to the system of FIG. 4, multiplied symbols have positive values or negative values and a final operation value is relatively small.

If the correlation module operates according to the method of FIGS. 6a to 6c, operation upon CP symbols and/or SP symbols results in a very large value. However, operation upon symbols except for CP symbols and/or SP symbols yields a small value. That is, the operation value calculated by the correlation module as in FIG. 5c or FIG. 5d is relatively small, whereas the operation value of the correlation module upon pilot symbols as in FIG. 5e is relatively large.

As described above, the correlation modules calculate a plurality of operation values. When selecting the correlation module having a maximum operation value, a finally estimated integer frequency offset may be determined. The integer frequency offset estimation module 460 shown in FIG. 4 compares the operation values calculated by the correlation modules and determines a final integer frequency offset.

The operation method described with reference to FIGS. 6a to 6c may be explained by the following equations. A template indicating all combination relationships between pilot (CP and/or SP) symbols within two consecutive OFDM symbols is expressed by the following Equation 1.

$$d_{l,m}(n, i) = \frac{P_m(i)}{P_l(n)} \quad \text{[Equation 1]}$$

Equation 1 shows template information provided by the template module illustrated in FIG. 4. In Equation 1, n and i are different subcarrier indices of the same OFDM symbol, and n∈$P_l$, i∈$p_m$, and $l,m$∈{0,1}, where $P_l$ and $P_m$ are sets of sub-carrier indices of pilot symbols in the l-th and the m-th OFDM symbols. $P_l$(k) indicates a pilot symbol or data symbols transmitted by the k-th sub-carrier of the l-th OFDM symbol and is generated by a phase shift keying (PSK) or quadrature amplitude modulation (QAM) scheme. When using correlations of all pilot symbols within consecutive OFDM symbols, the following Equation 2 can be obtained.

$$X(f) = \sum_{n,i \in P_l, P_m} d_{l,m}(n, i) Y_l(n+f) Y_m^*(i+f) \exp(j2\pi f N_T(m-l)/N) \quad \text{[Equation 2]}$$

In Equation, $Y_l$(k) is the k-th sample of the l-th OFDM symbol after passing through fast Fourier transform, N is a size of the fast Fourier transform, $N_T$ is a length of an OFDM symbols including a guard interval, and f is a candidate for value of an integer frequency offset. Equation 2 yields an operation value calculated in the correlation module 450 shown in FIG. 4.

$$\hat{\Delta}_i = \underset{|f| \leq M}{\operatorname{argmax}} \{\operatorname{Re}(X(f))\} \quad \text{[Equation 3]}$$

Equation 3 is performed by the integer frequency offset estimation module 460 shown in FIG. 4 and serves to determine a maximum value of Equation 2. In Equation 3, M and $\hat{\Delta}_i$ indicates a maximum allowable value of a candidate for integer frequency offset value and an estimated integer frequency offset value, respectively.

As described above, this exemplary embodiment operates, unlike the prior art, upon all pilot symbol (CP and SP symbols) included in at least two OFDM symbols. In this case, since the number of pilot symbols is increased, it may take much time to obtain multiplication and addition with respect to all combination of symbols as illustrated in FIGS. 6a to 6c. Therefore, another exemplary embodiment, which will be described hereinbelow, groups an entire frequency band into a plurality of frequency band groups and processes separated operation for each frequency band group.

FIG. 7 illustrates an example of a receiving system according to another exemplary embodiment of the present invention. The system of FIG. 7 includes a Fourier transform module 710, a time delay module 720, a copy module 730, a template module 740, a correlation module 750, and an integer frequency offset estimation module 760. The system of FIG. 7 further includes a grouping controller 770 for controlling operation of the correlation module 750.

Each module of FIG. 7 corresponds to each module of FIG. 4, and therefore, repetitive description will be omitted. Hereinafter, an operation method performed by the correlation module 750 according to the control of the grouping controller 770 will be described.

FIGS. 8a to 8c illustrate examples of grouping a frequency band into a plurality of frequency band groups under the control of the grouping controller 770. FIG. 8a illustrates groups grouped centering on pilot symbols in the first OFDM symbol, and FIG. 8b illustrates groups grouped centering on pilot symbols in the second OFDM symbol. As shown, an entire frequency band including CP symbols and SP symbols may be divided into 10 frequency band groups 801, 802, 803, 804, 805, 806, 807, 808, 809, and 810.

FIG. 8c illustrates pilot symbols and/or data symbols participated in operation within each frequency band group. An operation module of FIG. 7 operates upon the first frequency band group 801 and calculates the first intermediate result; operates upon the second frequency band group 802 and calculates the second intermediate result; operates upon the third frequency band group 803 and calculates the third intermediate result; operates upon the fourth frequency band group 804 and calculates the fourth intermediate result; operates upon the fifth frequency band group 805 and calculates the fifth intermediate result; operates upon the sixth frequency band group 806 and calculates the sixth intermediate result; operates upon the seventh frequency band group 807 and calculates the seventh intermediate result; operates upon the eighth frequency band group 808 and calculates the eighth intermediate result; operates upon the ninth frequency band group 809 and calculates the ninth intermediate result; operates upon the tenth frequency band group 810 and calculates the tenth intermediate result. The first to tenth intermediate results are summed to yield an operation value of the operation module. When operating upon the first frequency band group 801 to calculate the first intermediate result, only pilot symbols and/or data symbols within the corresponding group 801 are used as illustrated in FIG. 8c. Accordingly, the operation module of FIG. 7 can calculate an operation value faster than the operation module of FIG. 4.

As illustrated in FIGS. 8a and 8b, respective groups 801 to 810 may partially overlap each other. The sizes of the respective groups may be the same or different. Hereinafter, an example of grouping a frequency band group in a 2K mode will be described.

FIG. 9 illustrates an example of grouping a frequency band into frequency band groups in a 2K mode. As shown, CP symbols are arranged by a PRBS and SP symbols are arranged at intervals of 12 symbols. A group including 12 sub-carriers on each of the right and left of each central pilot symbol, that is, a group having a width corresponding to a total of 25 sub-carriers may be determined as one frequency band group.

Hereinafter, performance according to the two aforementioned examples will be described. Through simulation, the performance of the proposed methods was evaluated. Specifically, a 2K-mode digital video broadcasting system was considered and data symbols were generated through a QPSK scheme. Five candidates for frequency offsets were used for simulation and the length of a guard interval was set to 256 samples which are ⅛ of the length of an OFDM symbol. A multipath channel has 9 paths and has a characteristic that power of each path is exponentially reduced. Meanwhile, a maximum multipath delay was 8.75 μs and a maximum Doppler frequency was 100 Hz.

FIGS. 10 and 11 illustrate probability of failure in an integer frequency offset of two conventional methods and two proposed methods in an additive white Gaussian noise environment and a multipath environment. Each point was obtained through repeated simulation about 1000 times.

In FIGS. 10 and 11, Method 1 and Method 2 are methods according to the prior art. Specifically, Method 1 is based on conventional CP symbol correlation and Method 2 is based on conventional CP/SP symbol correlation. Method 3 is based on the example of FIG. 4 and Method 4 is based on the example of FIG. 7.

As shown, the methods according to the exemplary embodiment of the present invention use more combination relation information provided by the pilot symbols than the conventional methods, and therefore, have excellent integer frequency offset estimation performance. The two proposed methods show a difference of a minimum of 3 dB in performance compared with the conventional methods. If a signal-to-noise ratio (SNR) in a multipath environment is above −11 dB, the proposed Method 3 and Method 4 are reversely changed in performance. This means that, in the multipath environment in which an SNR used for performance evaluation is above −11 dB, Method 4 may be used which is less complicated than Method 3 and has excellent integer frequency offset estimation performance.

As apparent from the above description, the frequency offset estimation scheme can estimate a frequency offset by better performance than a conventional method, in an OFDM based digital broadcasting system.

It will be understood that industrial applicability is satisfied since the present invention is applied to various OFDM-based systems.

The above-described embodiments have been given to provide convenience of description of the present invention and the present invention is not limited to specific numbers, symbol configurations etc. used in the above-described embodiments.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A receiving apparatus for receiving a signal according to an orthogonal frequency division multiplexing (OFDM) scheme, the receiving apparatus comprising:
    an OFDM symbol acquisition module for acquiring at least two consecutive OFDM symbols;
    a symbol operation module for operating upon pilot symbols and/or data symbols belonging to frequency bands determined according to a plurality of candidates for integer frequency offsets among a plurality of pilot symbols and a plurality of data symbols included in the acquired OFDM symbols; and
    an integer frequency offset estimation module for selecting a final integer frequency offset among the plurality of candidates for integer frequency offsets according to magnitudes of operation values obtained by the symbol operation module;
    wherein the frequency bands determined according to the plurality of candidates for integer frequency offsets are obtained by frequency-shifting preset frequency bands at which all pilot symbols are transmitted according to the plurality of candidates for integer frequency offsets;
    wherein the symbol operation module includes:
        correlation modules equal to a number of the plurality of candidates for integer frequency offsets; and
        a template module for providing the correlation modules with template information about pilot symbols included in the OFDM symbols;
    wherein each of the correlation modules operates, using the template information, upon pilot symbols and/or data symbols belonging to frequency bands determined according to one candidate integer frequency offset; and
    wherein the template information is information about a ratio of different pilot symbol values.

2. The receiving apparatus of claim 1, wherein the OFDM symbol acquisition module includes:
    a Fourier transform module for performing Fourier transform upon a received signal; and
    a time delay module for acquiring the at least two consecutive OFDM symbols by time-delaying an output of the Fourier transform module.

3. The receiving apparatus of claim 1, wherein each correlation module calculates multiplications of all combinations of pilot symbols and/or data symbols belonging to frequency bands determined according to the one candidate for integer frequency offset, operates upon the calculated multiplications according to the template information, and sums operation values according to the template information.

4. The receiving apparatus of claim 1, wherein the pilot symbols are continual pilot symbols or scattered pilot symbols.

5. A method for estimating an integer frequency offset, wherein the method being performed by a receiving apparatus for receiving a signal according to an orthogonal frequency divisional multiplexing (OFDM) scheme, the method comprising:
    at an OFDM symbol acquisition module included in the receiving apparatus, acquiring at least two consecutive OFDM symbols;
    at a symbol operation module included in the receiving apparatus, operating upon pilot symbols and/or data symbols belonging to frequency bands determined according to a plurality of candidates for integer frequency offsets among a plurality of pilot symbols and a plurality of data symbols included in the acquired OFDM symbols; and
    at an integer frequency offset estimation module included in the receiving apparatus, determining a final integer frequency offset among the plurality of candidates for integer frequency offsets according to magnitudes of operation values obtained by the operating;
    wherein the frequency bands determined according to the plurality of candidates for integer frequency offsets are obtained by frequency-shifting preset frequency bands at which all pilot symbols are transmitted according to the plurality of candidates for integer frequency offsets;
    wherein the operating upon the pilot symbols and/or data symbols includes:
        at a symbol operation module included in the receiving apparatus, acquiring template information about pilot symbols included in the acquired OFDM symbols; and
        at a symbol operation module included in the receiving apparatus, calculating a plurality of operation values corresponding to the plurality of candidates for integer frequency offsets, by operating, using the template information, upon pilot symbols and/or data symbols belonging to frequency bands determined according to the plurality of candidates for integer frequency offsets among a plurality of pilot symbols and a plurality of data symbols included in the OFDM symbols; and wherein the template information is information about a ratio of different pilot symbol values.

6. The method of claim 5, wherein the acquiring at least two consecutive OFDM symbols includes:

performing Fourier transform upon a received signal; and acquiring the at least two consecutive OFDM symbols by time-delaying the Fourier transformed output.

7. A receiving apparatus for receiving a signal according to an orthogonal frequency division multiplexing (OFDM) scheme, the receiving apparatus comprising:

an OFDM symbol acquisition module for acquiring at least two consecutive OFDM symbols;

a symbol operation module for operating upon pilot symbols and/or data symbols belonging to frequency bands determined according to a plurality of candidates for integer frequency offsets among a plurality of pilot symbols and a plurality of data symbols included in the acquired OFDM symbols; and an integer frequency offset estimation module for determining a final integer frequency offset among the plurality of candidates for integer frequency offsets according to magnitudes of operation values obtained by the symbol operation module;

wherein the symbol operation module includes:

a grouping module for performing grouping;

correlation modules of a number equal to a number of the plurality of candidates for integer frequency offsets; and a template module for providing the correlation modules with template information about pilot symbols included in the OFDM symbols;

wherein each of the correlation module operates, using the template information, upon pilot symbols and/or data symbols belonging to frequency bands determined according to one candidate for integer frequency offset by individually operating upon pilot symbols and/or data symbols contained in each of the frequency band groups, and sums intermediate results calculated individually from each frequency band group, thereby generating an operation value; and wherein the template information is information about a ratio of different pilot symbol values.

8. The receiving apparatus of claim 7, wherein the OFDM symbol acquisition module includes:

a Fourier transform module for performing Fourier transform upon a received signal; and a time delay module for acquiring the at least two consecutive OFDM symbols by time-delaying an output of the Fourier transform module.

9. The receiving apparatus of claim 7, wherein the correlation module calculates multiplications of all combinations of pilot symbols and/or data symbols belonging to each of the frequency band groups, operates upon the calculated multiplications according the template information, and sums operation values according to the template information.

10. The receiving apparatus of claim 7, wherein the pilot symbols are continual pilot symbols or scattered pilot symbols.

11. A method for estimating an integer frequency offset, wherein the method being performed by a receiving apparatus for receiving a signal according to an orthogonal frequency division multiplexing (OFDM) scheme, the method comprising:

at an OFDM symbol acquisition module included in the receiving apparatus, acquiring at least two consecutive OFDM symbols;

at a symbol operation module included in the receiving apparatus, operating upon pilot symbols and/or data symbols belonging to frequency bands determined according to a plurality of candidates for integer frequency offsets among the plurality of pilot symbols and a plurality of data symbols included in the acquired OFDM symbols; and at an integer frequency offset estimation module included in the receiving apparatus, determining a final integer frequency offset among a plurality of candidates for integer frequency offsets according to magnitudes of operation values obtained by the operation;

wherein the operating upon the pilot symbols and/or data symbols includes:

at a symbol operation module included in the receiving apparatus, acquiring template information about pilot symbols included in the acquired OFDM symbols; and at a symbol operation module included in the receiving apparatus, calculating a plurality of operation values corresponding to the plurality of candidates for integer frequency offsets, by operating, using the template information, upon pilot symbols and/or data symbols belonging to each of the frequency band groups among pilot symbols and/or data symbols belonging to frequency bands determined according to each of the plurality of candidates for integer frequency offsets and summing intermediate results calculated individually from each of the frequency band groups; and wherein the template information is information about a ratio of different pilot symbol values.

12. The method of claim 11, wherein the acquiring at least two consecutive OFDM symbols includes:

performing Fourier transform upon a received signal; and acquiring the at least two consecutive OFDM symbols by time-delaying the Fourier transformed output.

* * * * *